(12) United States Patent
Stevens

(10) Patent No.: US 7,437,180 B1
(45) Date of Patent: Oct. 14, 2008

(54) OVER-THE-AIR SIGNALING SERVICE METHOD AND APPARATUS

(75) Inventor: James A. Stevens, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 426 days.

(21) Appl. No.: 10/315,436

(22) Filed: Dec. 10, 2002

(51) Int. Cl.
H04B 1/38 (2006.01)

(52) U.S. Cl. .................. 455/557; 455/518; 455/519; 455/520

(58) Field of Classification Search ............. 455/557, 455/575, 558, 566, 550, 90, 556.2, 556.1, 455/516–521
See application file for complete search history.

(56) References Cited

U.S. PATENT DOCUMENTS

| | | | |
|---|---|---|---|
| 4,167,700 A * | 9/1979 | Coe et al. ............... 380/33 |
| 5,259,018 A * | 11/1993 | Grimmett et al. ........ 455/551 |
| 5,305,384 A * | 4/1994 | Ashby et al. ............ 380/29 |
| 5,592,480 A | 1/1997 | Carney et al. .......... 370/347 |
| 5,940,384 A | 8/1999 | Carney et al. .......... 370/347 |
| 6,011,785 A | 1/2000 | Carney et al. .......... 370/330 |
| 6,374,079 B1 * | 4/2002 | Hsu ....................... 455/11.1 |
| 6,658,268 B1 * | 12/2003 | Bodnar et al. .......... 455/556.2 |
| 2003/0114163 A1 * | 6/2003 | Bickle et al. ............ 455/450 |
| 2003/0177245 A1 * | 9/2003 | Hansen ................... 709/228 |
| 2003/0199266 A1 * | 10/2003 | Zavidniak .............. 455/410 |

OTHER PUBLICATIONS

Co-pending U.S. Appl. No. 10/315,402, entitled "System And Method For Implementing A Retransmission Bridge" filed on an even date, inventor James A. Stevens, filed Dec. 10, 2002.
What We Do: Networking: Advanced Network Communications System, p. 1 of 1, BBN Technologies, http://www.bbn.com/networking/ancs.html, published Jul. 24, 2003.

* cited by examiner

Primary Examiner—Edward Urban
Assistant Examiner—Raymond S Dean
(74) Attorney, Agent, or Firm—Nathan O. Jensen

(57) ABSTRACT

A method and apparatus is disclosed for retrofitting to an existing radio, the radio not having built in over-the-air signaling capabilities. The device and method include using an interface configured to interface to the radio and providing electrical signals to the radio. Further, using a signal generating device that is configured to generate a signal representative of a communication connection to be set up. And still further, using a user interface that is configured to receive input from a user and communicate the input to the signal generating device.

11 Claims, 13 Drawing Sheets

User on Net A is Automatically Retransmitted to Net B by Static Retransmission Service Retx Service determines that two waveforms (ESIP net and HQ net) use the same vocoder but different encryption. JTR Set SCA Operating Environment instantiation of Have Quick waveform with presets for Aviation Sqd HQ Voice Net and OE instantiates Have Quick Retx Service sends tone to Co A User indicating retx success so user can start talking I. When Co A Users is through with conversation, he dials 999 to end retransmission and he switches back to his Co A ESIP Voice Net preset J. Retx requests SCA OE to tear down HaveQuick waveform

OVER-THE-AIR SIGNALING SERVICE METHOD AND APPARATUS

REFERENCE TO RELATED PATENT APPLICATIONS

This application is related to U.S. patent application Ser. No. 10/315,402 titled "System and Method for Implementing a Retransmission Bridge", filed on the same day herewith and which is incorporated herein by reference.

BACKGROUND

The invention relates generally to wireless radio systems. The invention also relates to push-to-talk radio systems which may be retrofitted with equipment to interface with multiple frequency band, multiple channel radio systems using over-the-air signaling.

Stovepipe Legacy radios and Legacy wireless networks are conventionally difficult to upgrade to support new services or interoperate with other network systems. Conventionally, human operators at a new service site may be used to intervene to proxy for Legacy users to support new services. Switching/interconnection equipment may be used to support crossbanding or retransmission services between these different systems, but are either limited to predefined communication planning or require manual human operator intervention at the switching/interconnection equipment site(s).

Accordingly, there is a need to easily and inexpensively allow stovepiped Legacy radio systems to support new services or interoperate with other systems without using predefined crossbanding/retransmission communication planning or requiring manual operator intervention at the switching/interconnection sites.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a device for retrofitting to an existing radio. The radio does not have built in over-the-air signaling capabilities. The device includes an interface that is configured to interface to the radio and to provide electrical signals to the radio. The device also includes a signal generating device. The signal generating device is configured to generate a signal representative of a communication connection to be set up. Further, the device includes a user interface configured to receive input from a user and to communicate the input to the signal generating device.

Another example of the invention relates to a method of using a radio not configured for communication over a radio system using over-the-air signaling for establishing communication connections. The radio is to be used for communication over a radio system using over-the-air signaling. The method includes removing a first handset from the radio. The method also includes providing a second handset having a signal generating device configured for generating signals representative of a communication connection to be set up. Further, the method includes establishing a communication connection between the second handset and the radio.

Yet another example of the invention relates to a radio network. The radio network includes a first non-trunking radio node. The radio network also includes a gateway radio node in communication with the first non-trunking radio node. Further, the radio network includes a second non-trunking radio node in communication with the gateway radio node and communicating with the first non-trunking radio node. The connection between the first and second non-trunking radio nodes is established through a signaling protocol, the signaling action commenced by a user of one of the first and second non-trunking radio nodes.

Yet still another example of the invention relates to a radio network. The radio network includes a non-trunking radio node. The radio network also includes a gateway radio node in communication with the non-trunking radio node. Further, the radio network includes a trunking radio node in communication with the gateway radio node and communicating with the non-trunking radio node. The connection between the non-trunking radio node and the trunking radio node is established through a signaling protocol. The signaling action is commenced by a user of the non-trunking radio node.

Yet still a further example of the invention relates to a radio network. The radio network includes a non-trunking radio node. The radio network also includes a gateway radio node in communication with the non-trunking radio node. Further, the radio network includes a networked node with wireless or wired network connectivity to the gateway radio node and communication with the first non-trunking radio node. The connection between the non-trunking radio node and the networked node is established through a signaling protocol, the signaling action commenced by a user of the non-trunking radio node.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
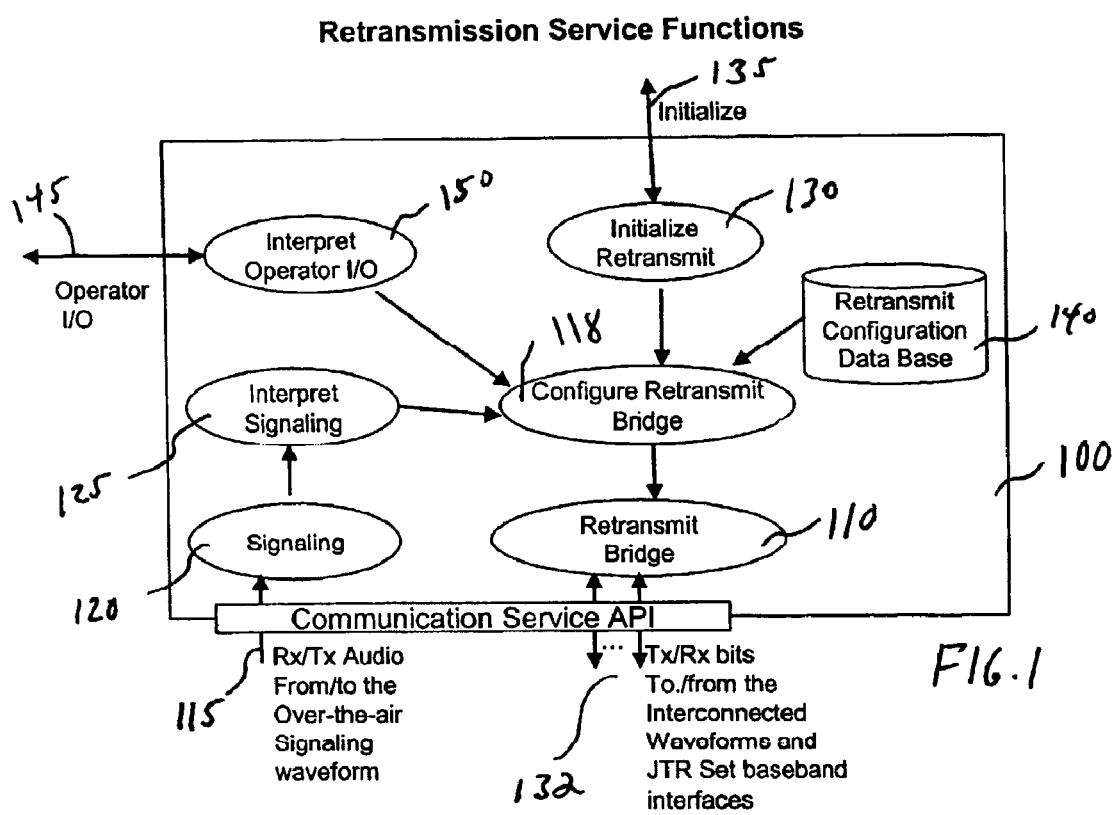
FIG. 1 is an exemplary diagram of retransmission service functions.

Before describing, in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to an exemplary embodiment, the new over-the-air retransmission signaling protocol may use audio tones and may be similar in concept to that of tone dialing in a conventional telephone network. In an exemplary embodiment, end users may have a keypad at their radios on which they can dial and the keypad generates the signaling tones.

The tones are sent over-the-air to a retransmit node, where the tones are converted into digits for the retransmit signaling function to interpret and process according to a predefined "dialing plan." According to an exemplary embodiment, the "dialing plan" may not be part of the protocol, but may be part of the communication plan definition.

Figure 2:
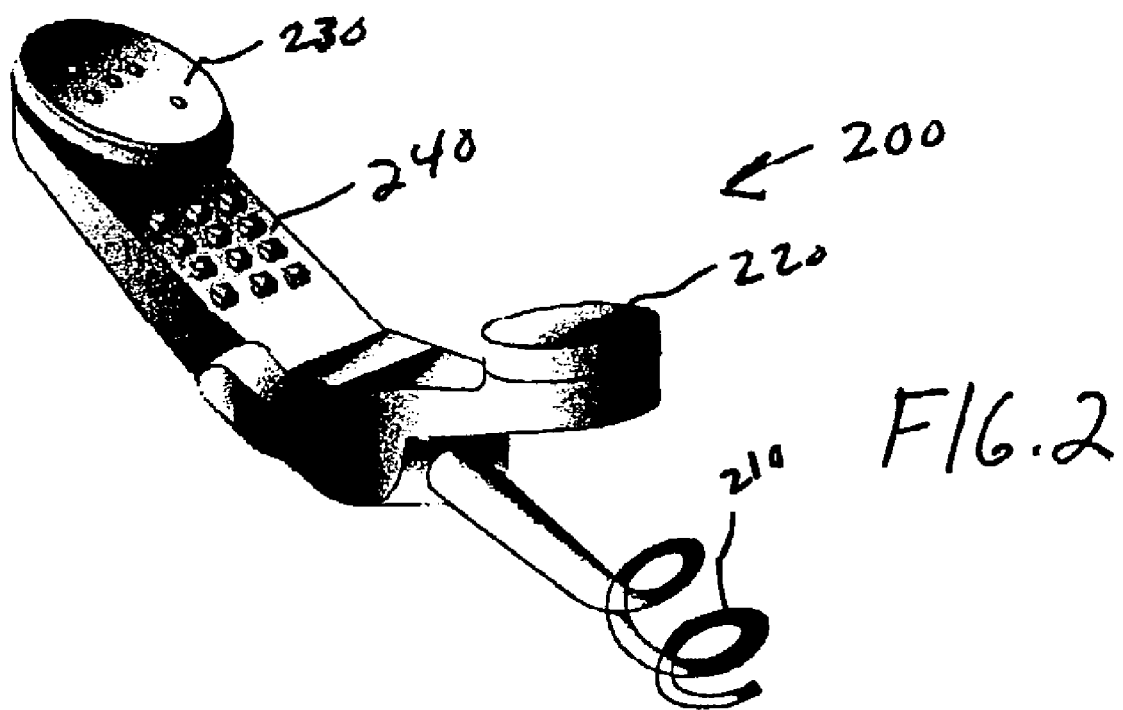
FIG. 2 is an exemplary depiction of a retrofit handset for over-the-air signaling.

Referring to FIG. 1, a retransmission system 100 may include a retransmission bridge 110 which is configured to retransmit incoming messages from radios which are not conventionally configured to use over-the-air signaling to provide for a communication connection, such as but not limited to, Legacy radios. Such radios may be retrofitted with a handset 200 (FIG. 2) which may include but is not limited to a wired connection 210 to the radio. The wired connection may alternatively be replaced with a short-range wireless communication device. A microphone 220 and a speaker 230 may also be included on handset 200. Further, a set of input devices such as buttons 240 may be configured for use by a user. Buttons 240 may be configured in a typical telephone keypad arrangement or may be configured in alternative ways.

Handset 200 may be used to replace a standard handset which would be conventionally supplied with radios such as Legacy radios. Handset 200 provides therein a signal generating device activated by depression of buttons 240. The signals generated are then communicated over-the-air to retransmit bridge configuration unit 118 (FIG. 1) through path 115 where signaling 120 is received and a signal interpretation unit 125 communicate with retransmit bridge configuration unit 118. Retransmission bridge configuration unit 118 communicates to configure retransmit bridge 110. Once retransmit bridge 110 is configured in accordance with the signaling supplied over path 115, and with signals from a retransmission initialization module 130 which is provided with initialization over path 135 for establishing the communication connection, the retransmission is sent over path 132. Configuration of retransmission bridge 110 is made by accessing a retransmit configuration database 140 based on the signaling interpreted at 125.

Figure 15:
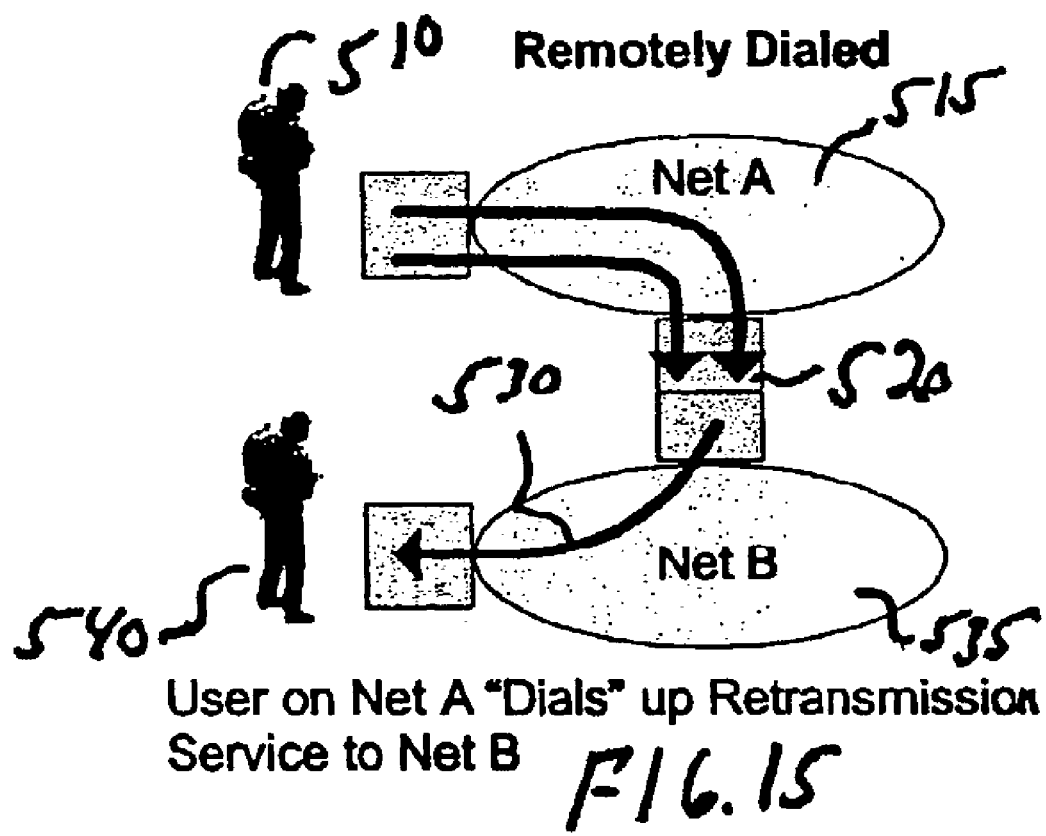
FIG. 15 is an exemplary depiction of a remotely dialed retransmission service.

Such a service is depicted in FIG. 15 in which a user 510 of a radio such as a Legacy radio, which is using a communication network A 515, dials and/or provides signaling over network A to a retransmission bridge 520. Retransmission bridge 520 interprets the signal, configures the retransmission bridge 520, and provides a communication connection 530 over network B 535 to an intended receiver 540. Further, users of network B may be able to use retransmit bridge 520 to send messages out over network A to user 510.

Figure 14:
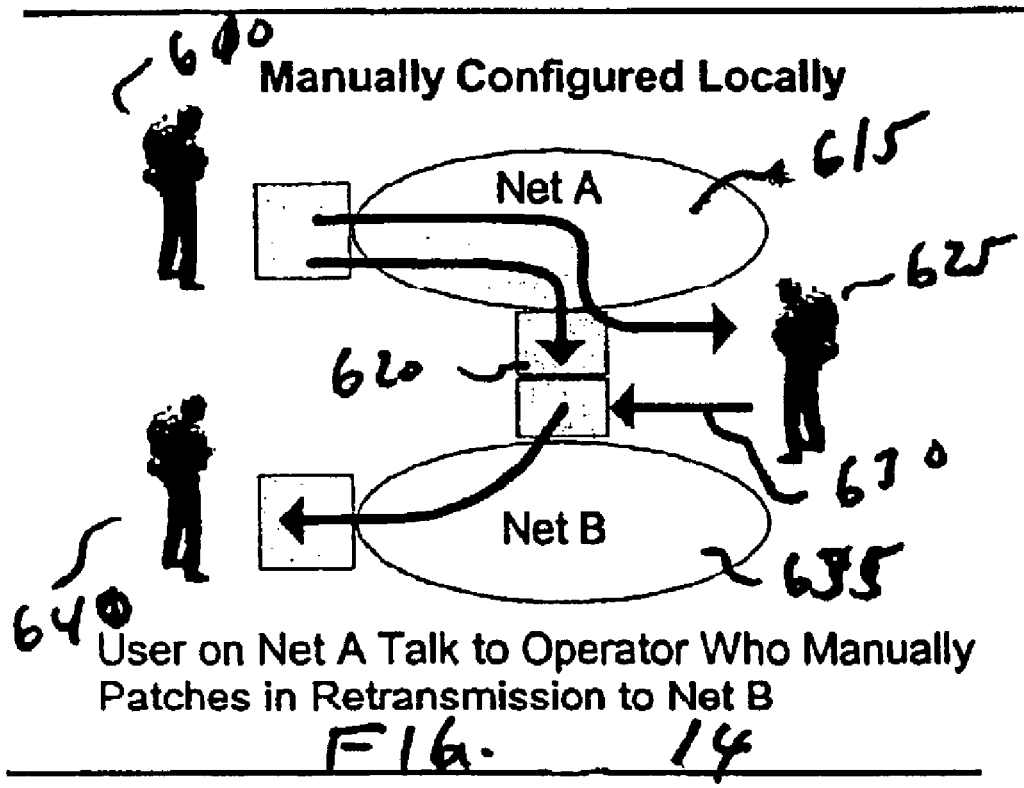
FIG. 14 is an exemplary depiction of a manually configured locally retransmission service.

Referring again to FIG. 1, retransmit bridge 110 may be used as a manually configured retransmission bridge in which an operator provides operator input and output along path 145 based on an operator interpretation 150 to configure retransmit bridge 118 to provide the appropriate retransmission. Such a manually configured situation is depicted in FIG. 14 in which a user 610 sends a message over network A 615 and to a retransmission bridge 620 and simultaneously to an operator 625. Operator 625 manually configures retransmit bridge 620 or path 630 to retransmit the message from user 610 over network B 635 to user 640.

Figure 13:
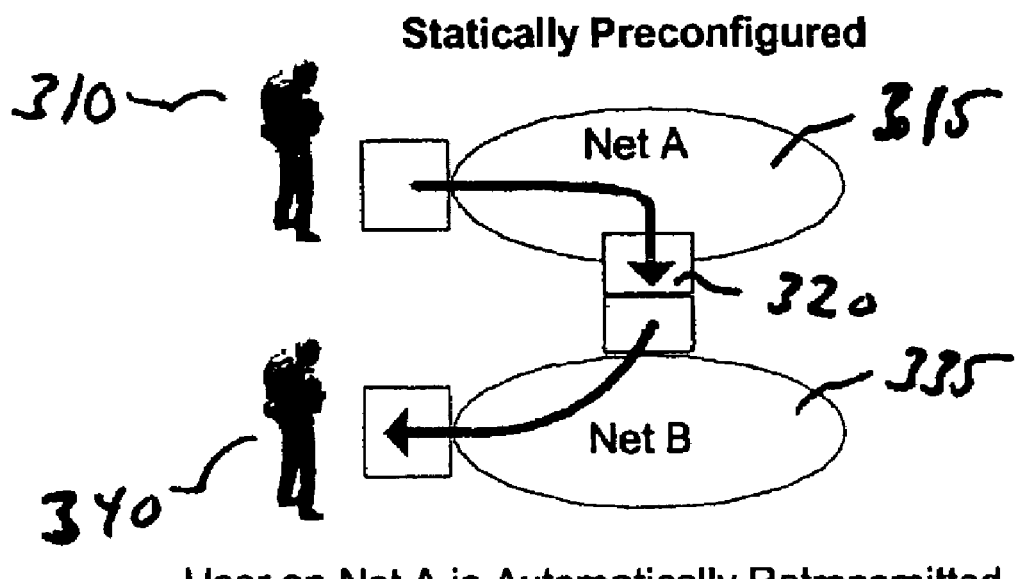
FIG. 13 is an exemplary depiction of a statically pre-configured retransmission service.

Referring again to FIG. 1, retransmit bridge 110 may also be statically pre-configured, as depicted in FIG. 13 in which a message from a user 310 is provided over a network A 315 and provided to a retransmission bridge 320. Retransmission bridge 320 is pre-configured in a certain way to automatically retransmit the message from user 310 over network B 335 to a user 340.

In an exemplary embodiment, JTRS users are able to input the dialing using the present system hardware. Because the tones are audio signals, Legacy users could replace their existing handsets with modified handsets having signal generating capabilities.

Referring again to FIG. 2, an example of a modified handset is illustrated. One embodiment includes 12 keys—identical to that of a public switched telephone DTMF keypad, to reduce user training.

In an exemplary embodiment, such a signaling protocol would allow Legacy radio users to deploy alongside Army forces using JTRS and obtain the benefits of JTRS networking for their Legacy radios.

Note that once such a signaling capability is added to Legacy radios, then C3 applications can be developed by the Government to take advantage of this signaling. For example, logistics database updates could be made similar to how users can access their credit card accounts today (i.e. via a touch tone phone).

Figure 9:
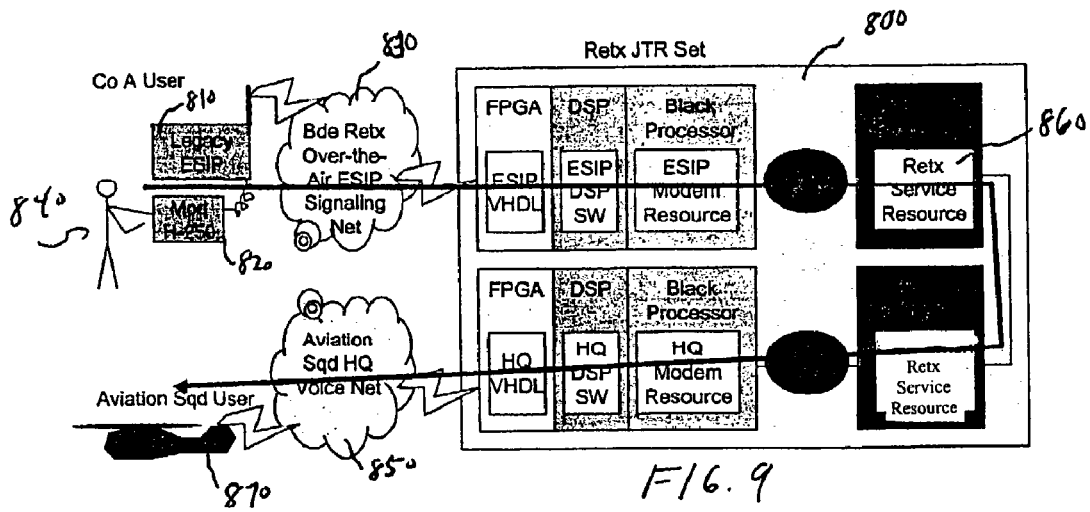
FIG. 9 is an exemplary depiction of the system of FIG. 3 in which the Legacy user talks with the retransmission service and the retransmission service retransmits voice to the aviation squad user.
Figure 10:
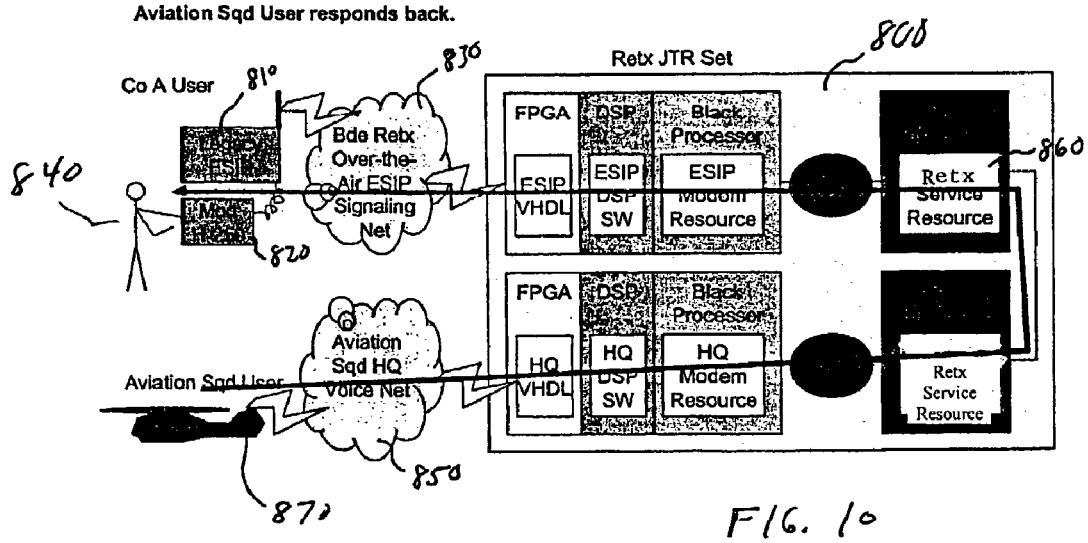
FIG. 10 is an exemplary depiction of the system of FIG. 3 in which the aviation squad user responds back to the Legacy user through the retransmission service.
Figure 11:
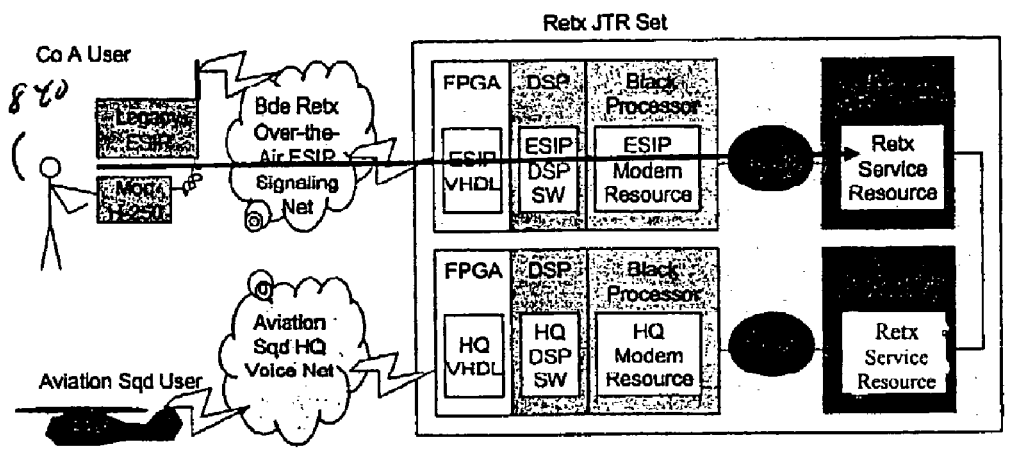
FIG. 11 is an exemplary depiction of the system of FIG. 3 in which the Legacy user dials a termination sequence to end retransmission.
Figure 12:
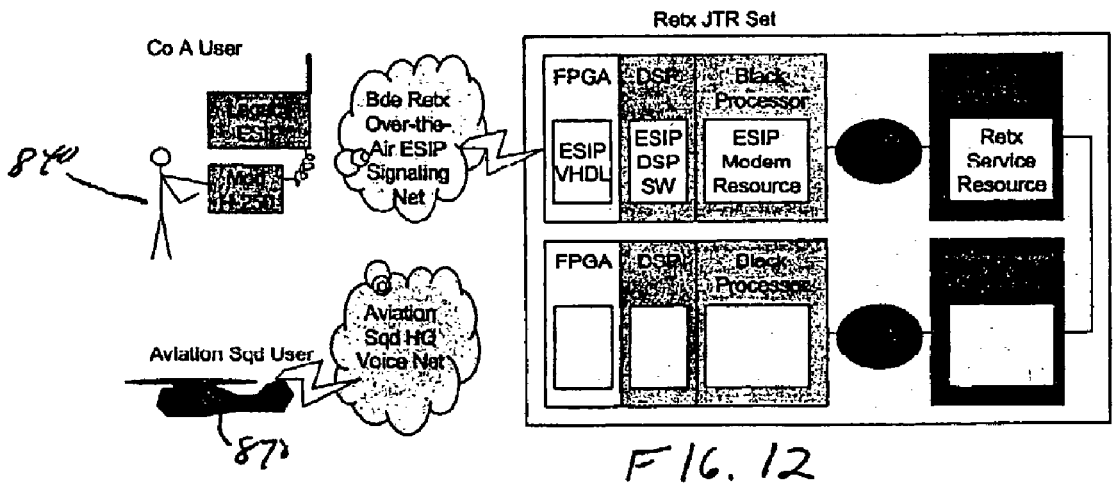
FIG. 12 is an exemplary depiction of the system of FIG. 3 in which the retransmission service tears down the waveform used and the retransmission bridge.

Referring now to FIGS. 3-12, the operation of the over-the-air signaling retransmission service using the example of a Company A Legacy user talking to the Aviation Squad User is depicted. The figures step through the set up of the retransmission service over-the-air steps (FIGS. 3-8), the use of the resultant retransmission service (FIGS. 9-10), and the teardown of the service (FIGS. 11-12).

Figure 3:
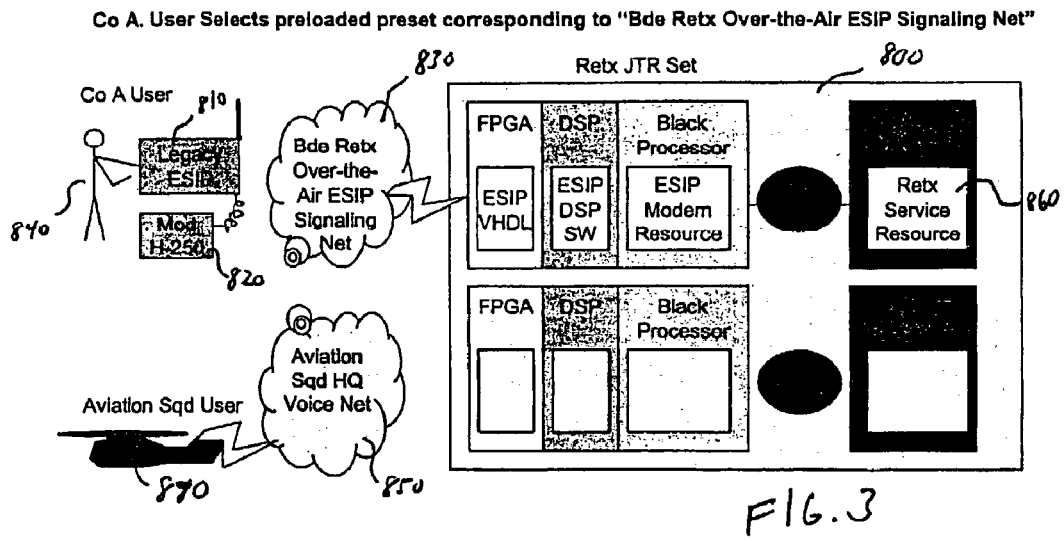
FIG. 3 is an exemplary diagram of a Legacy user preparing to contact an aviation squad user.

In FIG. 3, a Legacy radio 810 user 840 having a modified handset 820 selects a preloaded preset on Legacy radio 810 which corresponds to retransmission over-the-air using the retransmission service implemented by retransmission bridge 800.

Figure 4:
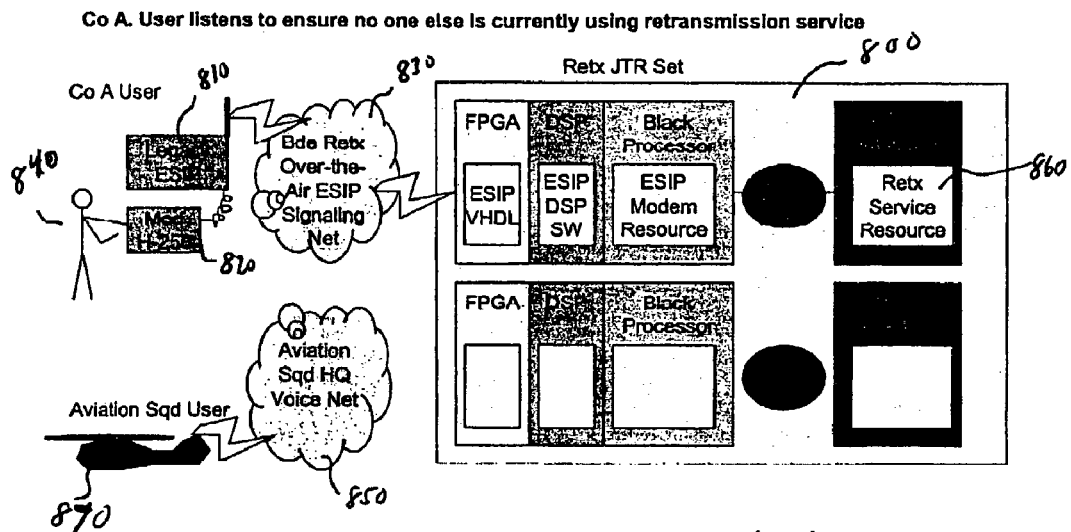
FIG. 4 is an exemplary depiction of the system of FIG. 3 in which a user is listening to determine current users of a retransmission service.

In FIG. 4, the Legacy radio 810 transmits, using the modified handset 820, over-the-air 830 to retransmission bridge 800. In such a situation, Company A user 840 listens to ensure that no one else is currently using the retransmission service before transmitting.

Figure 5:
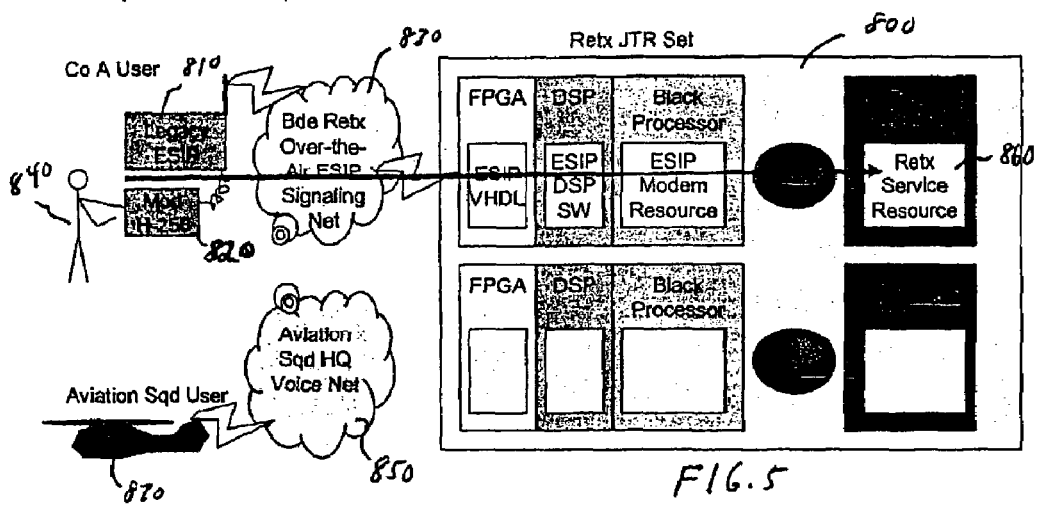
FIG. 5 is an exemplary depiction of the system of FIG. 3 where the user dials requesting retransmission to the aviation squad user.

In FIG. 5, the Company A user dials a number, for example '150', on his modified handset 820 which requests service to the aviation squad headquarter voice network 850. In this example, '150' identifies the destination voice network for the communication connection, however, dialed numbers or like signaling techniques may be used to identify a waveform, a user, or a network to be used. Networks may include public telephone networks and cellular or other mobile phone networks.

Figure 6:
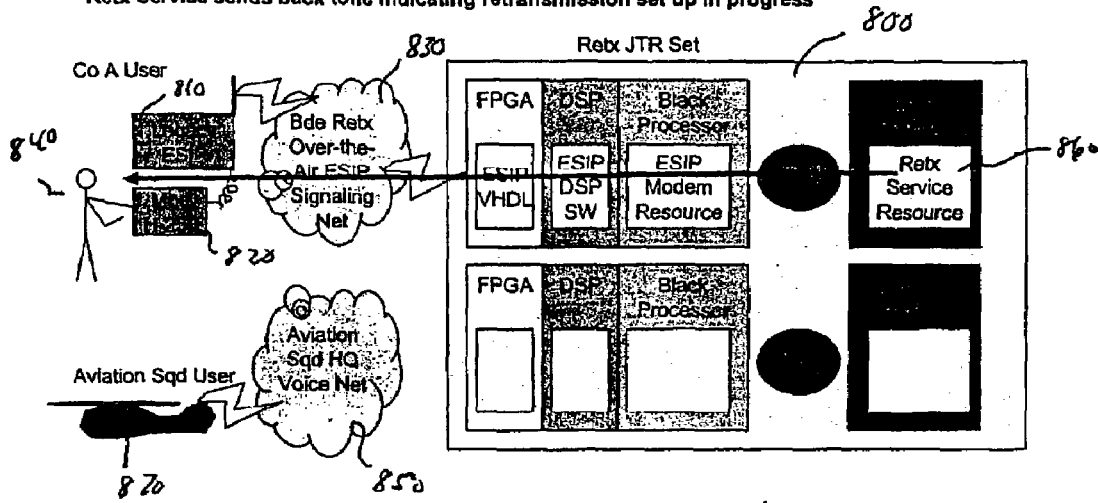
FIG. 6 is an exemplary diagram of the system of FIG. 3 in which the retransmission service sends back a tone indicating retransmission set up is in progress.

In FIG. 6, the retransmission service resource 860 determines that it can satisfy the request and sends back a tone to user 840 indicating that the retransmission set up is in progress. If the retransmission service resource 860 determines that it cannot satisfy the request, it may be configured to send back a busy tone or other indication to user 840.

For example, if the dialing plan allows for priority and preemption, the user could have dialed '1506' where the '6' indicates the priority and the retransmission service could have preempted a lower priority existing service.

Figure 7:
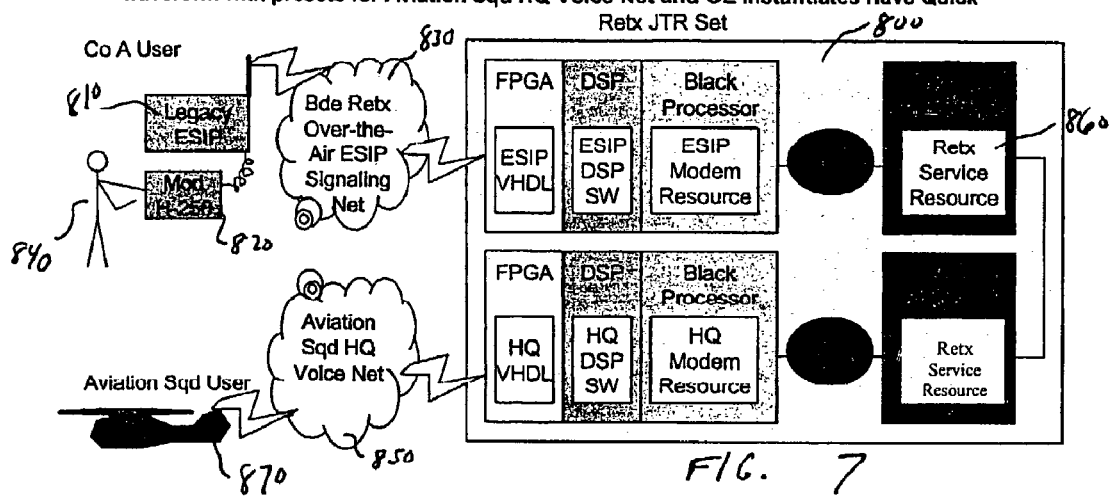
FIG. 7 is an exemplary diagram of the system of FIG. 3 in which the retransmission service determines that the two connecting waveforms use the same vocoder but different encryption and loads the desired waveform and retransmission bridge service.

In FIG. 7, the retransmission service 860 determines that the two waveforms, the ESIP net coming from Legacy radio 810 and the HQ net waveform used by an aviation squad user 870, use the same vocoder but different encryption. In such an instance, the retransmission bridge 800 instantiates loading of the proper encryption and waveform for each communication path and the retransmission bridge between the paths.

Figure 8:
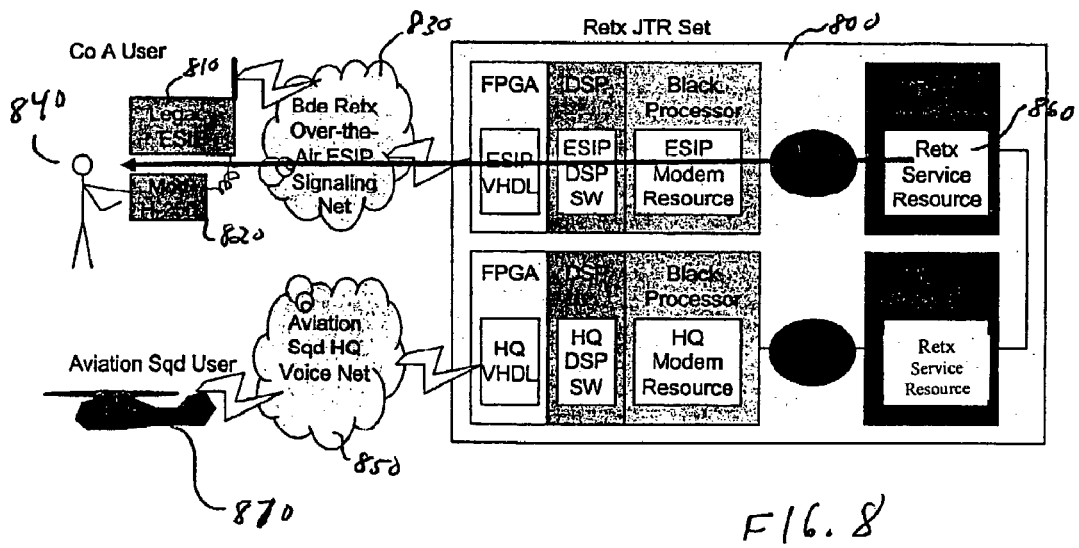
FIG. 8 is an exemplary depiction of the system of FIG. 3 in which the retransmission service sends a tone to the Legacy user indicating retransmission success so that the user may start talking.

Referring to FIG. 8, the retransmission service then sends a tone to user 840 indicating that the retransmission is a success and therefore user 840 may begin talking to aviation squad user 870.

Referring now to FIG. 9, user 840 begins talking and the retransmission bridge 800, using retransmission resource 860, retransmits the voice to aviation squad user 870.

In many situations, as depicted in FIG. 10, aviation squad user 870 then responds back to user 840 using the same retransmission bridge 800.

Referring now to FIG. 11, when user 840 is through with the conversation, he dials a pre-defined dialing sequence, such as but not limited to '999' to end the retransmission and to switch back to the original Company A ESIP voice net pre-set protocol. Alternatively, the service could have timed out after no activity or after a predetermined amount of use.

Referring to FIG. 12, the retransmission requests that the retransmission waveform used to communicate with aviation squad user 870 is taken down and the retransmission service is completed. In addition to supporting the retransmission between legacy, non-networked waveforms, the over-the-air signaling service could be used to set up retransmission service between a legacy, non-networked waveform and a network (either waveform, wireline, or combination).

Figure 16:
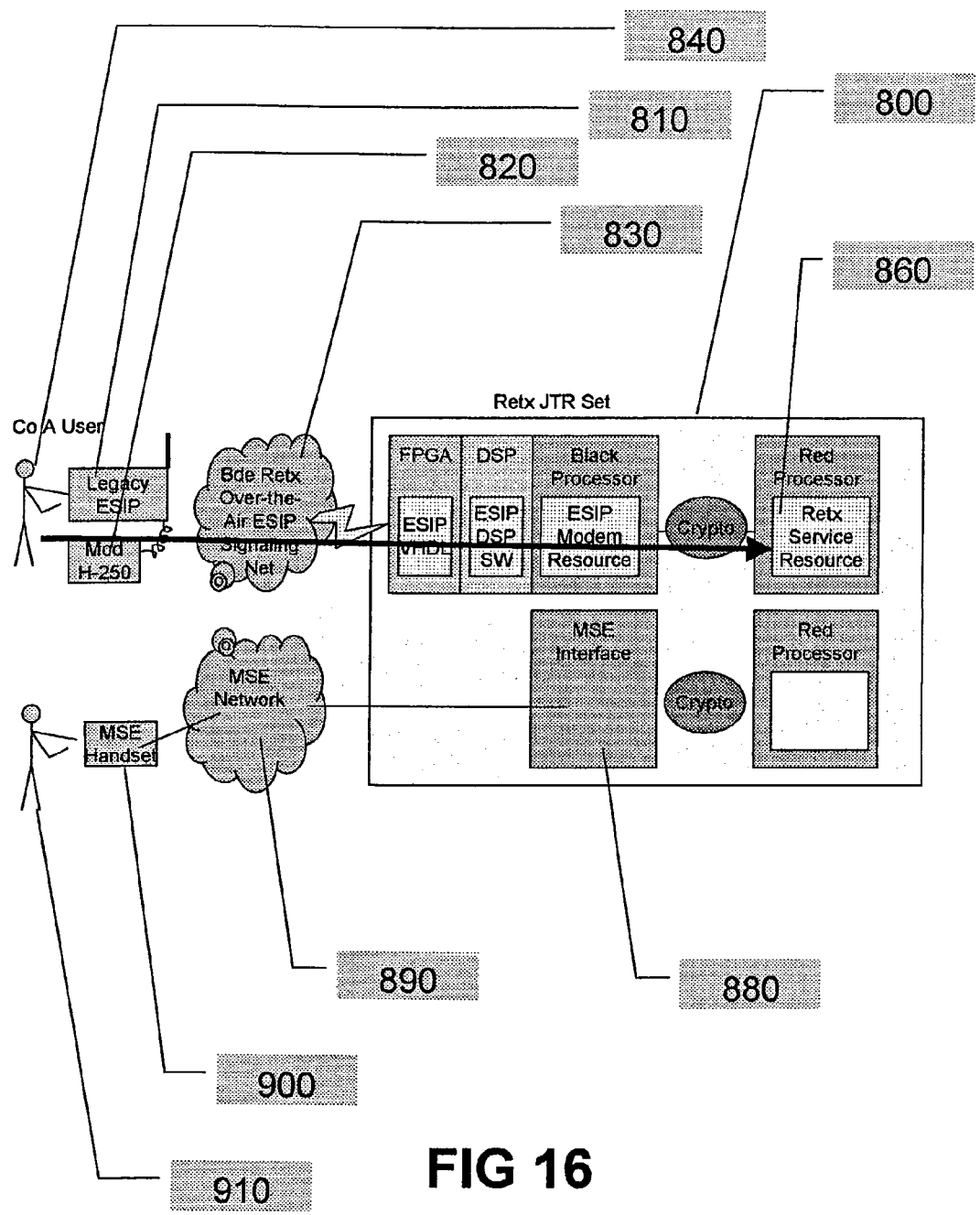
FIG. 16 is an exemplary diagram of a Legacy user initiating a connection to a mobile subscriber equipment user.

Referring to FIG. 16, a Legacy radio 810 user 840 wants to dial to a user 910 connected to the Mobile Subscriber Equipment (MSE) network 890. User 840 selects a preloaded present on Legacy radio 810, listens to ensure that no one else is currently using the retransmission service before transmitting, and dials a number on his modified handset 820 to indicate retransmission service to the MSE network plus the address of MSE address of user 910. In this example, the Legacy radio user 840 dials '9224' where '9' identifies the MSE network and '224' is the MSE address of user 840.

Figure 17:
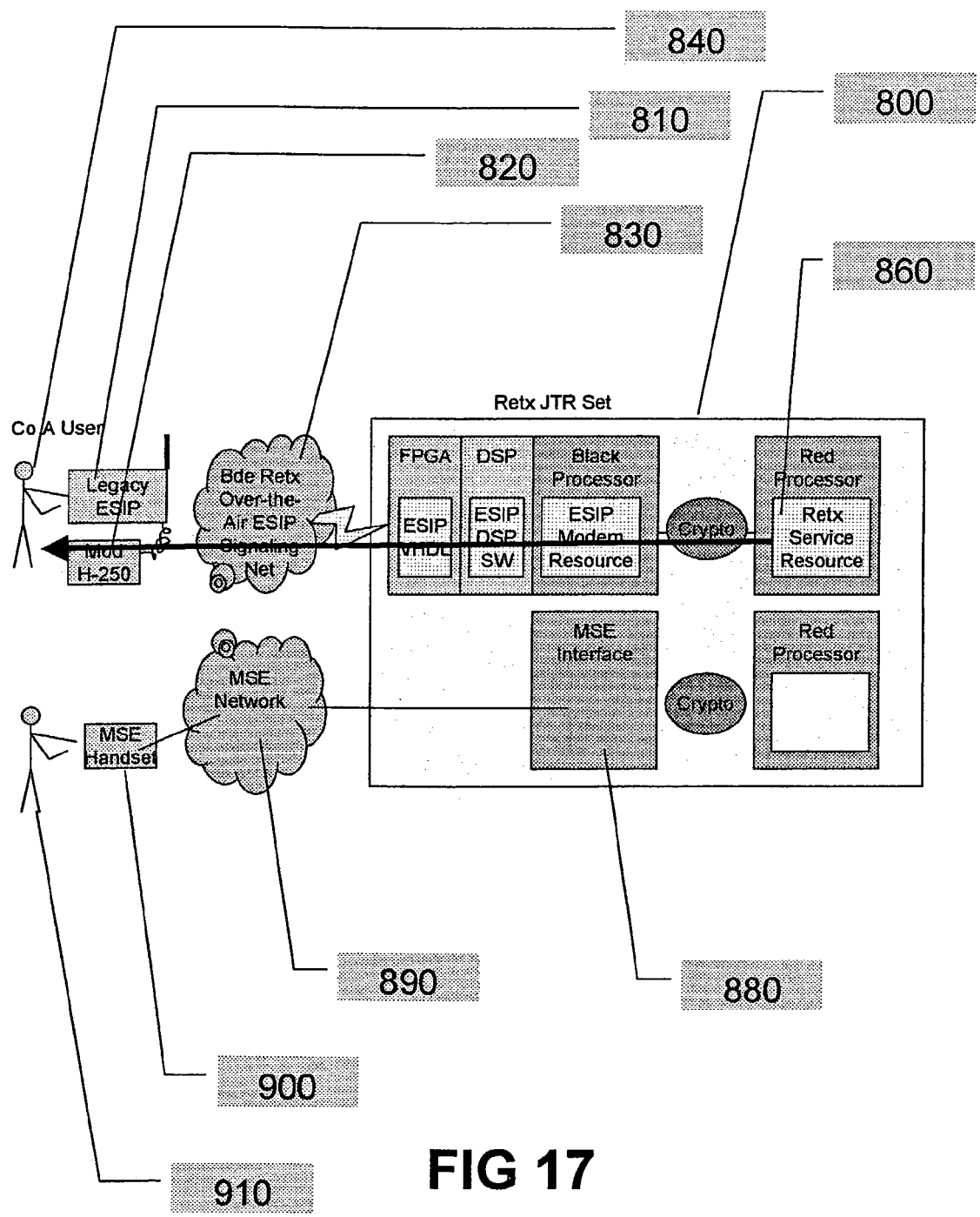
FIG. 17 is an exemplary depiction of the system of FIG. 16 in which the retransmission service sends back a signal indicating the status of the retransmission service.

Referring to FIG. 17, the retransmission service determines that it can satisfy the request and sends back a tone to user 840 indicating that the retransmission set up is in progress. If the retransmission service resource 860 determines that it cannot satisfy the request, say because the handset 900 of MSE user 910 is busy, it may be configured to send back a busy tone or other indication to user 840.

Figure 18:
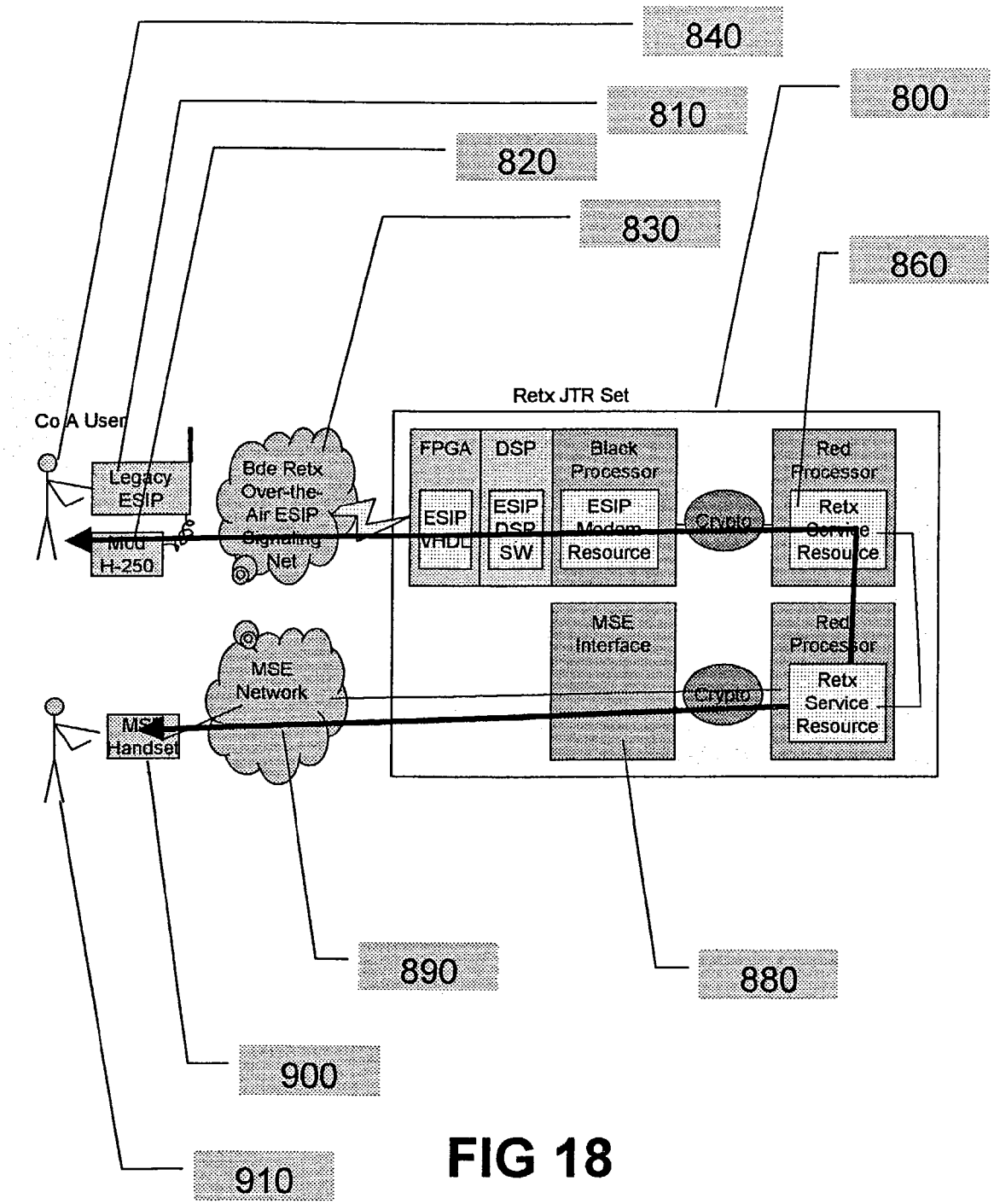
FIG. 18 is an exemplary depiction of the system of FIG. 16 in which the retransmission bridge is set up.

Referring to FIG. 18, the retransmission service instantiates loading of the proper encryption for each communication path, the dialing of address 224 into the MSE network via MSE interface 880, and the retransmission bridge between the paths.

The retransmission service may then send back a tone to user 840 indicating success in setting up the retransmission service and then allow the MSE network to send back appropriate signaling tones or indications. Alternatively, the retransmission service may 'trap' the MSE network signaling to send back the appropriate signaling tones or indications to the user.

Once MSE user 910 answers the call, user 840 begins talking and the retransmission bridge 860 retransmission the voice to the MSE user 910. In many situations, the MSE user 910 then responds back to user 840 using the same retransmission bridge.

When user 840 is through with the conversation, he dials a pre-defined dialing sequence, such as but not limited to '999' to end the retransmission. Alternatively the service could have timed out after no activity or after a predetermined amount of use. Or the service could have been terminated by MSE user 910 hanging up his handset 900 so that the MSE network 890 sends a termination signal to the retransmission service via the MSE interface 880.

An exemplary JTRS Retransmission Service enables automatic retransmission and routing operations between channels that are processing mode-compatible traffic at the same security level and use a standard audio representation that supports retransmission of similar and dissimilar voice modes. The Retransmission Service may interconnect serial data modes that have been coordinated end to end.

In addition to satisfying many threshold retransmission and relay requirements, JTRS may be configured to support over-the-air signaling so that Legacy radio users may "dial" into a JTR Set to connect with other waveforms and networks. Previously, Legacy users were limited to pre-assigned retransmission frequencies, or they needed an operator to manually patch in the desired retransmission crossbanding.

JTRS provides significant connectivity because JTRS may support a wide range of waveforms compared to Legacy radios. Without some sort of over-the-air signaling, however, Legacy radio users are still dependent upon using static pre-defined retransmit communication planning or operations who manually patch in desired waveforms. The inventive concept includes retransmission using over-the-air signaling, so Legacy users can "dial" the retransmission they need. Tone dialing may be in the form of retrofit handsets having signal generating devices therein for Legacy or other radios lacking a signaling capability. This low-cost signaling capability allows Legacy users, such as Reserve or National Guard units, to deploy alongside Army forces using JTR Sets and obtain the benefits of JTRS networking using Legacy radios.

Remote users may tune to predefined JTRS retransmit channels and then dial in their desired Retransmission Service from a list of predefined possible retransmit choices. User training is minimal because the dialing is similar to dialing with the public telephone network today. This over-the-air signaling capability can be enhanced in the future to improve addressing features.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of using a radio not configured for communication over a radio system using over-the-air signaling for establishing communication connections, for communication with an intended receiver over a trunked radio system using over-the-air signaling, the method comprising:
    removing a first handset from the radio that is not configured to user over-the-air signaling to provide for a communication connection;
    providing a second handset having a signal generating device configured for generating signals representative of a communication connection to be set up;
    establishing a communication connection between the second handset and the radio;
    using the second handset and the signal generating device to generate signals representative of the communication connection to be set up between the radio and the intended receiver; and
    transmitting the signals to a retransmission system having a retransmission bridge, the retransmission system for interpreting the signaling and configuring the retransmission bridge to set up the communication connection between the radio and the intended receiver based on the interpretation.

2. The method of claim 1, wherein the second handset comprises push buttons.

3. The method of claim 1, wherein the signal generating device comprises a tone modulation device.

4. The method of claim 3, wherein the tone modulation device comprises a dual tone multi-frequency modulation device.

5. The method of claim 1, wherein the radio comprises a legacy radio.

6. The method of claim 1, wherein the signal generating device includes a processor.

7. The method of claim 6, wherein the processor is used to enable a digital signaling protocol.

8. The method of claim 1, wherein the communication connection between the second handset and the radio comprises an interface plug.

9. The method of claim 1, further comprising:
    tuning the radio to a predefined frequency for signaling the retransmission system.

10. The method of claim 1, wherein the retransmission system comprises voice recognition software, the voice recognition software configured to associate commands of a user with received signals.

11. The method of claim 9, wherein the over-the-air signaling includes at least one of destination address information, priority identifier information, a waveform identifier and a user identifier.

* * * * *